(12) United States Patent
Falardeau et al.

(10) Patent No.: US 7,730,052 B2
(45) Date of Patent: Jun. 1, 2010

(54) SYSTEM AND METHOD FOR PROVIDING A VIRTUAL ITEM CONTEXT

(75) Inventors: Simon Falardeau, Laval (CA); Jerome Poulin, Montreal (CA)

(73) Assignee: SAP Aktiengesellschaft, Walldorf (DE)

( * ) Notice: Subject to any disclaimer, the term of this patent is extended or adjusted under 35 U.S.C. 154(b) by 372 days.

(21) Appl. No.: 11/880,602

(22) Filed: Jul. 23, 2007

(65) Prior Publication Data

US 2009/0030929 A1 Jan. 29, 2009

(51) Int. Cl.
*G06F 7/00* (2006.01)
(52) U.S. Cl. ...................... 707/707; 707/716
(58) Field of Classification Search ......... 707/100–102, 707/1–10, 200–205
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,615,109 A | 3/1997 | Eder | |
| 5,758,327 A | 5/1998 | Gardner et al. | |
| 5,870,716 A | 2/1999 | Sugiyama et al. | |
| 5,930,771 A | 7/1999 | Stapp | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,260,024 B1 | 7/2001 | Shkedy | |
| 6,341,351 B1 | 1/2002 | Muralidhran et al. | |
| 6,505,093 B1 | 1/2003 | Thatcher et al. | |
| 6,507,851 B1 | 1/2003 | Fujiwara et al. | |
| 6,701,299 B2 | 3/2004 | Kraisser et al. | |
| 6,725,204 B1 | 4/2004 | Gusley | |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,080,030 B2 | 7/2006 | Eglen et al. | |
| 7,082,408 B1 | 7/2006 | Baumann et al. | |
| 7,092,929 B1 | 8/2006 | Dvorak et al. | |
| 7,117,165 B1 | 10/2006 | Adams et al. | |
| 7,124,098 B2 | 10/2006 | Hopson et al. | |

(Continued)

FOREIGN PATENT DOCUMENTS

JP        2004-030343 A       1/2004

(Continued)

OTHER PUBLICATIONS

U.S. Appl. No. 60/374,892, filed Apr. 22, 2002, Krajec.

(Continued)

*Primary Examiner*—Wilson Lee
(74) *Attorney, Agent, or Firm*—Foley & Lardner LLP

(57) ABSTRACT

A virtual item set representing a subset of items stored within an original data structure. The system includes a virtual item set processor configured to generate a plurality of virtual items that are a subset of items in the original data structure, and a virtual item set including the plurality of virtual items. Each virtual item includes a data field containing a data item from the original data structure and a metadata field, the meta field data including position information representing the position of the data field within an original data structure.

17 Claims, 3 Drawing Sheets

U.S. PATENT DOCUMENTS

| | | |
|---|---|---|
| 7,124,984 B2 | 10/2006 | Yokouchi et al. |
| 7,139,731 B1 | 11/2006 | Alvin |
| 2001/0019778 A1 | 9/2001 | Gardaz et al. |
| 2001/0032130 A1 | 10/2001 | Gabos et al. |
| 2001/0039517 A1 | 11/2001 | Kawakatsu |
| 2001/0049634 A1 | 12/2001 | Stewart |
| 2002/0013731 A1 | 1/2002 | Bright et al. |
| 2002/0023500 A1 | 2/2002 | Chikuan et al. |
| 2002/0026368 A1 | 2/2002 | Carter, III |
| 2002/0059108 A1 | 5/2002 | Okura et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0107713 A1 | 8/2002 | Hawkins |
| 2002/0116241 A1 | 8/2002 | Sandhu et al. |
| 2002/0123930 A1 | 9/2002 | Boyd et al. |
| 2002/0138290 A1 | 9/2002 | Metcalfe et al. |
| 2002/0147668 A1 | 10/2002 | Smith et al. |
| 2002/0152128 A1 | 10/2002 | Walch et al. |
| 2002/0184116 A1 | 12/2002 | Tam et al. |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0074269 A1 | 4/2003 | Viswanath |
| 2003/0126024 A1 | 7/2003 | Crampton et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0200150 A1 | 10/2003 | Westcott et al. |
| 2003/0208365 A1 | 11/2003 | Avery et al. |
| 2003/0229502 A1 | 12/2003 | Woo |
| 2004/0010463 A1 | 1/2004 | Hahn-Carlson et al. |
| 2004/0098358 A1 | 5/2004 | Roediger |
| 2004/0122689 A1 | 6/2004 | Dailey et al. |
| 2004/0162763 A1 | 8/2004 | Hoskin et al. |
| 2004/0172321 A1 | 9/2004 | Vemula et al. |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0114270 A1* | 5/2005 | Hind et al. .............. 705/64 |
| 2005/0165659 A1 | 7/2005 | Gruber |
| 2005/0171825 A1 | 8/2005 | Denton et al. |
| 2005/0228786 A1* | 10/2005 | Murthy et al. ............. 707/3 |
| 2006/0020512 A1 | 1/2006 | Lucas et al. |
| 2006/0036507 A1 | 2/2006 | Pujar et al. |
| 2006/0112099 A1 | 5/2006 | Musgrove et al. |
| 2007/0050272 A1 | 3/2007 | Godlewski et al. |
| 2008/0082374 A1* | 4/2008 | Kennis et al. ............. 705/7 |
| 2009/0240737 A1* | 9/2009 | Hardisty et al. ......... 707/200 |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366 -375.

Melcher, "Local tech firm creates retail markdown tool", Mar. 24, 2000, Cincinnati Business Courier, 3 pages.

Profitlogic, available at http://webarchive.org/web/20020603118938/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

* cited by examiner

SYSTEM AND METHOD FOR PROVIDING A VIRTUAL ITEM CONTEXT

BACKGROUND OF THE INVENTION

The present invention relates generally to the field of database management and data manipulation for large quantities of data elements. More specifically, the present invention relates to a system and method for providing a virtual item context for data elements in a deep data structure.

Large numbers of data elements may be created where each data element represents a discrete item, concept, class of items, etc. The data elements may be associated with a plurality of data element fields. The data elements and data element fields may have been created over time, by a different set of users, represent a wide variety of objects, etc. such that a variety of structures may be associated with the data element and/or the data element fields.

The large number of data items may be organized within a deep item structure. The data elements may be stored in structures that are organized hierarchically, according to relationships, etc. In a data structure of significant size, actual data may be found several layers deep within the structure. The structure may include fields that are simple values, simple or deep structures, and/or tables of simple or deep structures.

Performance is always an issue when working with mass data. More specifically, updating fields of items, each represented by a deep structure, requires a relatively large amount of processing time. The large amount of processing time can negatively affect mass data processing.

Several issues arise when working on mass data organized into a deep item structure. Navigating and accessing structure fields is particularly processor intensive when the items are house within these structures. The intensive processing is required even though only a subset of the fields may actually required for processing.

Further, when working with deep structures in mass data processing, an XPath of a field cannot always be used in order to identify a field because the length of such a path is potentially infinite. An XPath is a concatenation of the field name and any parent field names starting at a root field continuing to the field identified by the XPath.

What is needed is a system and method for providing working access to item field subsets within a deep mass data structure. What is further needed is such a system and method configured to configured to allow entry of new values into the item field subsets and yet avoid utilization of a write-back operation to reduce processing overhead associated with the data element mass processing.

SUMMARY OF THE INVENTION

One embodiment of the invention relates to a system for providing a virtual item set representing a subset of items stored within an original data structure. The system includes a virtual item set processor configured to generate a plurality of virtual items that are a subset of items in the original data structure, and a virtual item set including the plurality of virtual items. Each virtual item includes a data field containing a data item from the original data structure and a metadata field, the meta field data including position information representing the position of the data field within an original data structure.

Another embodiment of the invention relates to a method for providing a virtual item set representing a subset of items within an original data structure. The method includes generating a plurality of virtual items that are a subset of items in the original data structure. Each virtual item includes a data field containing a data item from the original data structure and a metadata field, the meta field data including position information representing the position of the data field within an original data structure. The method further includes performing one or more mass data processing operations on the virtual items.

Yet another embodiment of the invention relates to a virtual item set representing a subset of items from an original data structure. The virtual item set includes a plurality of virtual items, each virtual item including a data field containing a data item from the original data structure and a metadata field, the meta field data including position information representing the position of the data field within an original data structure.

This summary and the following detailed description are directed to certain specific embodiments of the invention. The invention is not limited to the particular embodiments and applications described herein. The invention is defined only by the claims.

DETAILED DESCRIPTION OF THE PREFERRED EMBODIMENTS

Figure 1:
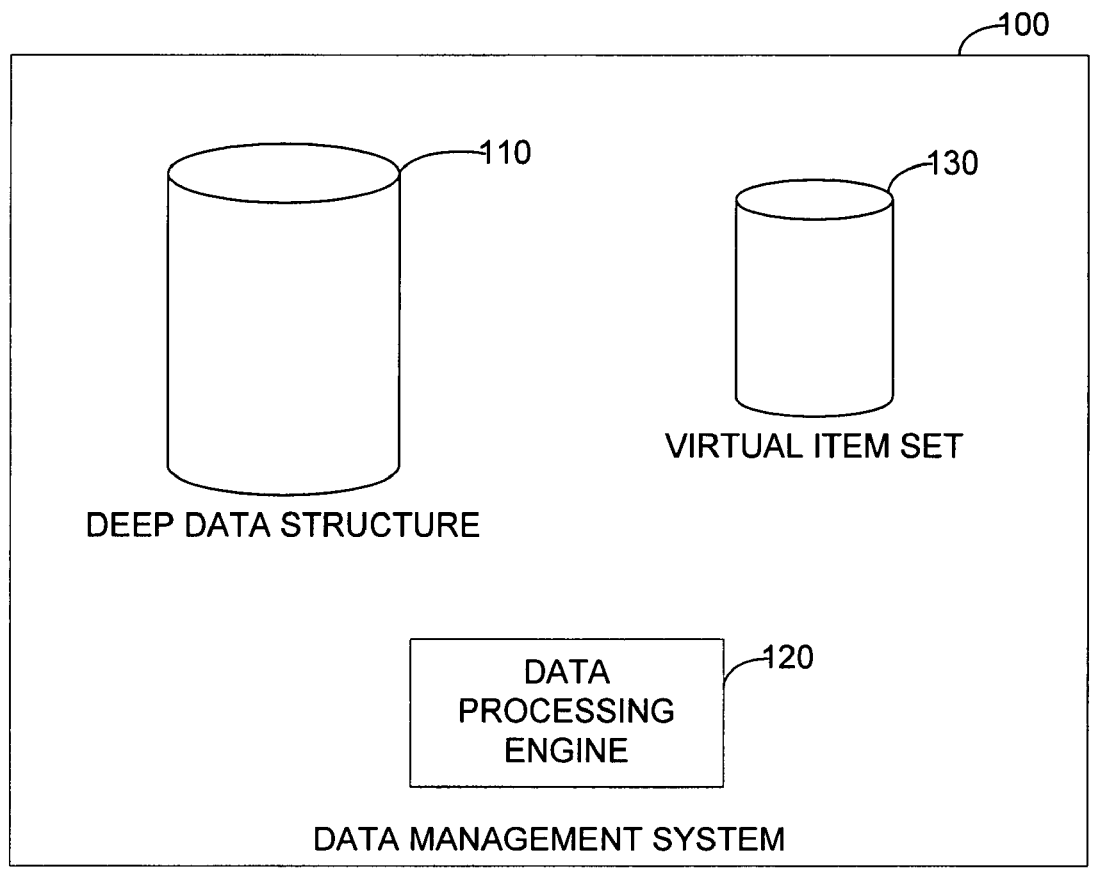
FIG. 1 is a system for providing a virtual item context for a deep data element structure, according to an exemplary embodiment.

Referring to FIG. 1, a data management system 100 for providing a virtual item context for a deep data element structure is shown, according to an exemplary embodiment. The provision of virtual item context for items within a deep item structure reduces processing requirements for users of deep data structures.

System 100 includes a deep structure database 110, a data processing engine 120, and a virtual item set structure 130. Although a particular configuration of system 100 is shown, system 100 may be implemented using a single database and processing system, a plurality of processing systems, a plurality of databases, etc. to perform the functions described herein. System 100 may further be configured to include more, fewer, and/or a different configurations of components to perform the functions described herein.

Deep structure database 110 may be any database or other collection of data configured to store a massive number of data items. Database 110 may be configured to implement standard database functionality, including but not limited to, storage of data elements, retrieval of data elements, data element sorting, etc. Database 110 may be implemented using RAM, ROM, one or more hard drives, and/or any other type of memory device.

An exemplary database may be a database of a data elements where each data element is representative of an article or type of article for sale in a retail setting. Other data elements may include entries in a table, computer records, products, a product class, etc. Each data element may be configured to include one or more data element fields. Exemplary data element fields may include information associated with the particular element. According to the exemplary embodiment, the data fields may be information related to the article for sale such as an identification number, a description, a color, pricing information, markdown information, etc. Although a database is described, data elements may alternatively be stored in a table, a linked list, or any other large data storage system or method.

According to an exemplary embodiment, data structure 110 may be a deep data structure. A deep data structure includes items whose data fields can be simple values, simple or deep structures, tables of simple or deep structures, etc. Accordingly, the field name and the depth of the data structure are not limited in a deep data structure. Deep data structures may further have the characteristic that standard path identifications, such as an XPath file identifier, cannot be utilized because of the length of the path and further because of the potential for infinite Xpath file identifiers.

Processing engine 120 may be any type of processor configured to process data elements stored in database 110. Instructions for processing data elements may be implemented as computer code including a plurality of instructions to be implemented using a computer processor.

Processing engine 120 may further be configured to receive a listing of data items to be include in the virtual item set 130. The listing of data items may be generated based on items known to be used within a particular application, items that have previously been accessed and are likely to be accessed again in the near future, items that are forecasted to be needed based on current processing instructions, etc. Processor 120 may be configured to iteratively populate the virtual item set 130 with data elements from database 110 to generate the virtual item set. Although some exemplary set generation techniques are provided herein, it should be understood that generating the virtual item set can encompass a wider variety of concepts and be either specific or very general.

Generating virtual item set 130 may be initiated by an action taken by a user, such as initiating a particular application, identifying particular items to be included in the virtual item set, etc. Processing can include selecting data item from the deep structure, populating a virtual item with the selected data item, and populating the virtual item with meta-data associated with the selected item. Creation, constitution, and maintenance of the virtual items are discussed in further detail below with reference to FIGS. 2 and 3.

Virtual item set 130 may be a database of data items. The data items in set 130 may be implemented as direct links to the items within deep data structure 110. Alternatively, the items may be copied and a link placed within deep data structure 110. Preferably, virtual item set 130 is implemented such that processes affect the data items directly and do not require a "write back" operation. The virtual item set is described in further detail below with reference to FIG. 2.

Figure 2:
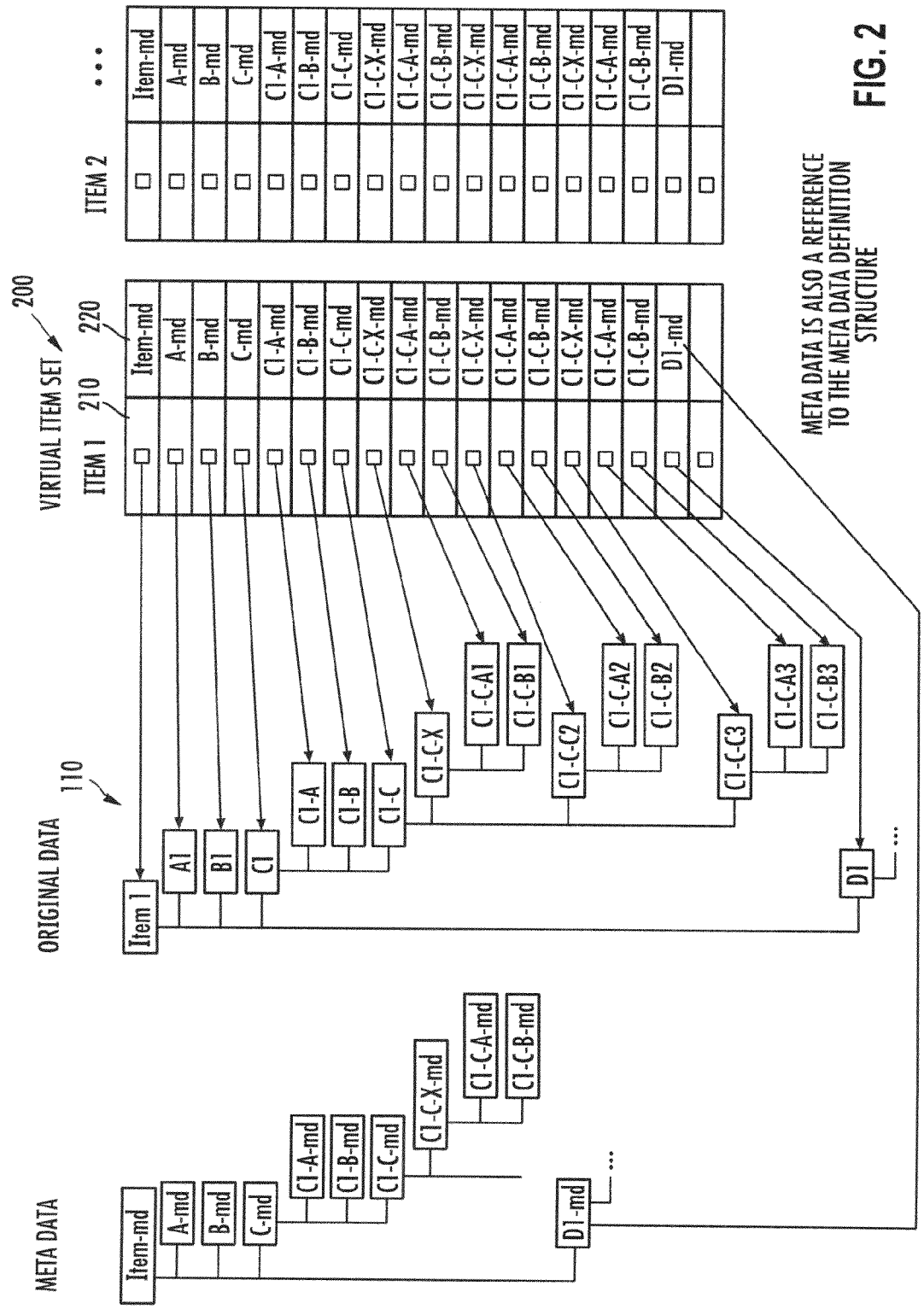
FIG. 2 is a representation of a virtual item context, according to an exemplary embodiment.

Referring now to FIG. 2, a virtual item set 200 is a data structure comprising a collection of item fields 210. Each item field 210 includes metadata 220 and an original item reference 230 referring to the original item field in structure 110. Virtual item set 200 may be configured to represent all or a subset of the fields from the original item.

Each item field 210 is configured to receive an assignment of each individual field from the original table of deep structure 110. Metadata 220 is configured to contain a record of the type and other characteristics of each individual field from the original table of deep structure 110. Exemplary meta data 220 may be a structure definition including field information and a link between parent and child field. The field information may include a name, a data type, a unique identifier, a parent identifier, any child identifiers, a component type, etc. Component types can include whether the field is a value, a structure, or a table. The structure type of the meta data is also a deep structure and can include tables (the table including both flat and deep structures), an object oriented pattern, or any other type of data structure. In the case a table is used, the table can be sorted, non-sorted, a hash table, etc.

Virtual item set 200 may then be used for processing. Accordingly, new or changed values are assigned to the item field reference within virtual item set 200 and written directly into the original item field. Creating a virtual item set containing the actual items eliminates the steps of locating the original item including carrying information to this same field.

Virtual item set 200 facilitates mass data operation for data stored in generic deep structures which includes processes working on any deep structure without requiring knowledge of the structure beforehand. Accordingly, the virtual item set data item works regardless of the deep structure definition.

Figure 3:
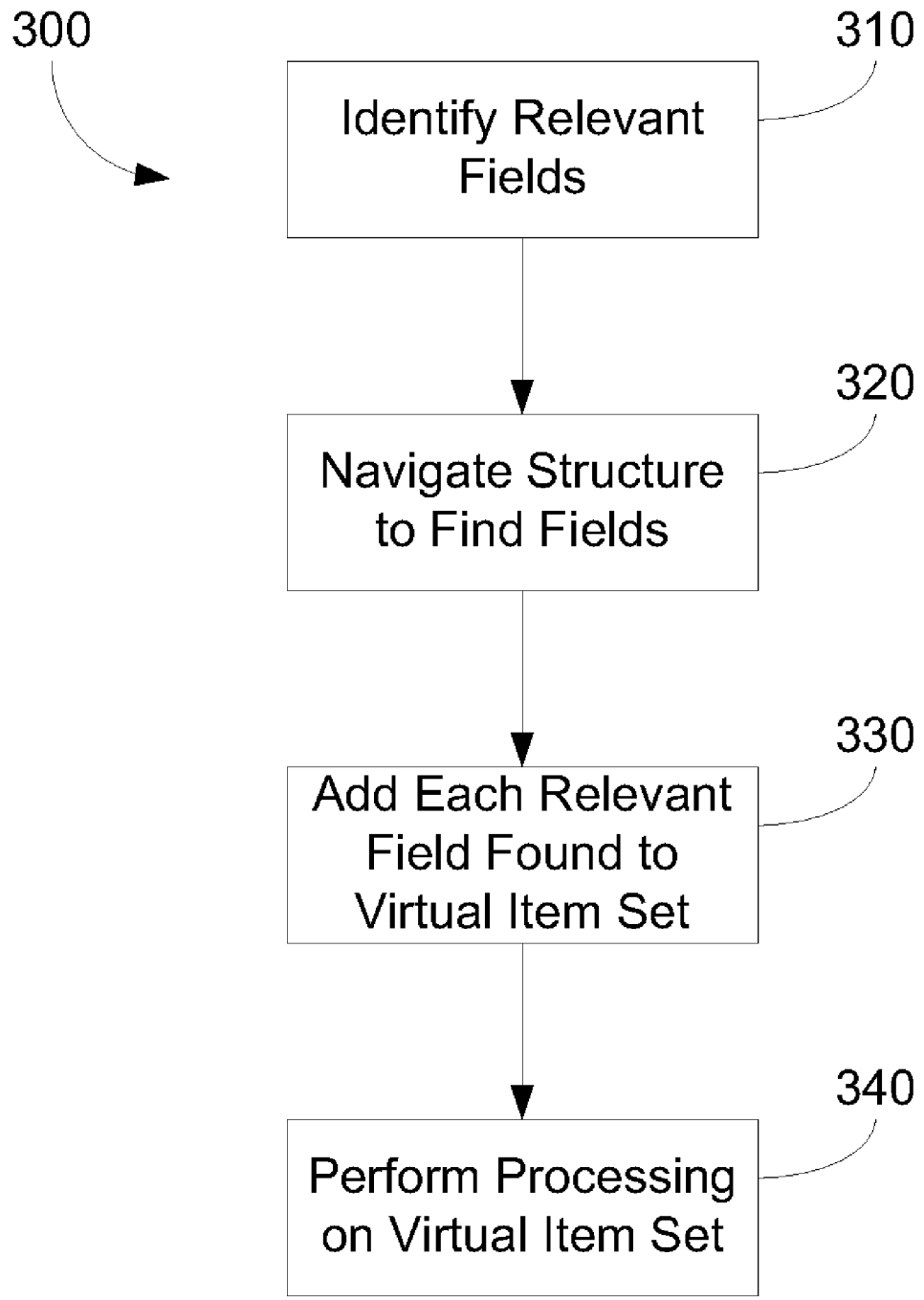
FIG. 3 is a flowchart illustrating a method for providing a virtual item context for a deep data element structure, according to an exemplary embodiment.

Referring now to FIG. 3, a flowchart 300 illustrating a method for populating a virtual item set 200 is shown, according to an exemplary embodiment. Although specific steps are shown and described as being performed in a specific order, it should be understood that the method may include more, fewer, and/or a different configuration of steps to implement the method described herein.

In a step, 310, system 100 is configured to identify one or more fields that are relevant for processing. Relevant fields may includes that fields specifically designated for inclusion in virtual item set 200, items have specified values for specified fields, etc. Relevant fields may include field having a pre-defined value, fields of a given type, fields within a defined group, etc.

In a step 320, system 100 is configured to perform navigation through the deep structure entities for all fields of all entries. Because of the nature of a deep element structure, traditional navigation based on a defined structure, navigation based on path definitions, etc. may be difficult. Accordingly, according to an exemplary embodiment, all fields of all entries within the deep element structure may be navigated to determine whether the field is relevant.

In a step 330, for each entry identified in step 310, a determination is made whether a field is relevant. If a field is relevant, a reference to this field is made and added to virtual item set 200 along with meta data describing and/or associated with the field. Composition of the virtual item set 200 and entries to the virtual item set are described in further detail above with reference to FIG. 2.

In a step 340, upon completion of virtual item set 200, such that all entries within the deep item structure have been processed, processing is performed on the virtual item set 200. Processing may include any action taken related to items in the virtual item set. According to an exemplary embodiment, modifications to items stored within virtual item set 200 will modify the actual items. Items within virtual item set 200 are the actual items and not copies such that the items within virtual item set 200 need to be written back to the deep element structure.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented system for providing a representation of a subset of items stored within an original data structure, comprising:

a computer-readable medium having computer-executable instructions stored thereon, the computer-executable instructions being executed by a processor to implement
a virtual item set processor configured to generate a virtual item set containing a plurality of virtual items, wherein the plurality of virtual items includes the subset of items in the original data structure, wherein each virtual item of the plurality of virtual items includes
a data field containing a reference to a data item in the original data structure, wherein the reference includes position information representing a position of the data item within the original data structure, and
a metadata field, wherein the metadata field contains information regarding characteristics of the data item to which the data field refers;
wherein the virtual item set processor is configured to receive a change to the data field, wherein the virtual item set processor is configured to change the data item in response to the received change to the data field, wherein the virtual item set processor is configured to change the data item directly in the original data structure using the reference.

2. The system of claim 1, wherein the virtual item set is at least one of a sorted table, a non-sorted table, and a hash table.

3. The system of claim 1, wherein the metadata field includes a name, a data type, a unique identifier, a parent identifier, a child identifier, and a data field type.

4. The system of claim 1, wherein the original data structure is a deep data structure.

5. The system of claim 1, wherein the virtual item set processor is further configured to perform at least one mass data processing operation.

6. The system of claim 1, wherein the data field is at least one of a value, a data structure and a table.

7. The system of claim 1, wherein the items stored within the original data structure represent articles for sale in a retail setting, wherein the metadata includes at least one of a description, color, price, and markdown of an article represented by an item.

8. The system of claim 1, wherein the virtual item set processor is configured to generate the virtual item set by performing at least one of selecting items used for a task and selecting recently accessed items.

9. A computer-implemented method for providing a representation of a subset of items within an original data structure, comprising:
   generating, using a processing engine, a virtual item set containing a plurality of virtual items, wherein the processing engine is implemented using computer-executable instructions executable by a processor and stored on a computer-readable medium, wherein the plurality of virtual items includes the subset of items in the original data structure, wherein each virtual item includes
      a data field containing a reference to a data item in the original data structure, wherein the reference includes position information representing a position of the data item within the original data structure, and
      a metadata field, wherein the metadata field contains information regarding characteristics of the data item to which the data field refers;
   receiving a change to the data field; and
   changing, using the processing engine, the data item in response to the received change to the data field, wherein the data item is changed directly in the original data structure using the reference.

10. The method of claim 9, wherein the virtual item set is at least one of a sorted table, a non-sorted table, and a hash table.

11. The method of claim 9, wherein the metadata field includes a name, a data type, a unique identifier, a parent identifier, a child identifier, and a data field type.

12. The method of claim 9, wherein the original data structure is a deep data structure.

13. The method of claim 9, wherein the data field is at least one of a value, a data structure and a table.

14. A computer-readable medium having computer-executable instructions stored thereon, wherein the computer-executable instructions are executable by a processor to implement a method for representing a subset of items from an original data structure, the method comprising:
   generating, using a processing engine, a virtual item set containing a plurality of virtual items, wherein the plurality of virtual items includes the subset of items in the original data structure, wherein each virtual item includes
      a data field containing a reference to a data item in the original data Strcture, and
      a metadata field, wherein the metadata field contains information regarding characteristics of the data item to which the data field refers;
   receiving a change to the data field; and
   changing, using the processing engine, the data item in response to the received change to the data field, wherein the data item is changed directly in the original data structure using the reference.

15. The computer-readable medium of claim 14, wherein the virtual item set is at least one of a sorted table, a non-sorted table, and a hash table.

16. The computer-readable medium of claim 14, wherein the metadata field further includes a name, a data type, a unique identifier, a parent identifier, a child identifier, and a data field type.

17. The computer-readable medium of claim 14, wherein the original data structure is a deep data structure.

* * * * *